United States Patent Office 2,706,745
Patented Apr. 19, 1955

2,706,745

PULSE INTEGRATION IN TELETYPEWRITER RECEIVERS

Biagio F. Ambrosio, Los Angeles, Calif.

Application November 17, 1953, Serial No. 392,778

2 Claims. (Cl. 178—70)

(Granted under Title 35, U. S. Code (1952), sec. 266)

The invention described herein may be manufactured and used by or for the Government of the United States of America for governmental purposes without the payment of any royalties thereon or therefor.

This invention relates to a signal regeneration system of the type wherein pulse signals are integrated with respect to time.

In the transmission of information in a pulse code, it is necessary at the receiving end to determine the presence or absence of a pulse at any given time. Previously known methods of making this determination involve sampling the output of the receiving device at intervals to detect the presence or absence of a signal. The great disadvantage of this method is that the sampling does not take into account the shape of the pulses being sampled. When noise or distortion blanks out a portion of a positive pulse, that pulse will not be detached if sampling should take place when the pulse is not at its full value. Interference will often cause a false signal to be present when no pulse is being sent. The disturbance may last for only a fraction of a transmitted pulse but if it occurs during the instant of selection a false indication will be generated. The losing of a destroyed pulse or the acceptance of noise as a signal will, in the operation of a teletypewriter, cause the selection of improper code bars and a wrong character will be printed. In the instant invention, incoming pulse signals are weighed by integrating with respect to time in a simple integrating circuit having a mechanically driven termination switch, consideration is also given to a reference voltage regulated by previous pulses and produced by additional integration networks.

An object of the invention is to provide simple, efficient means for the accurate determination of pulse code signals in the presence of interference.

Other objects and many of the attendant advantages of this invention will be readily appreciated as the same becomes better understood by reference to the following description.

Figure 1:
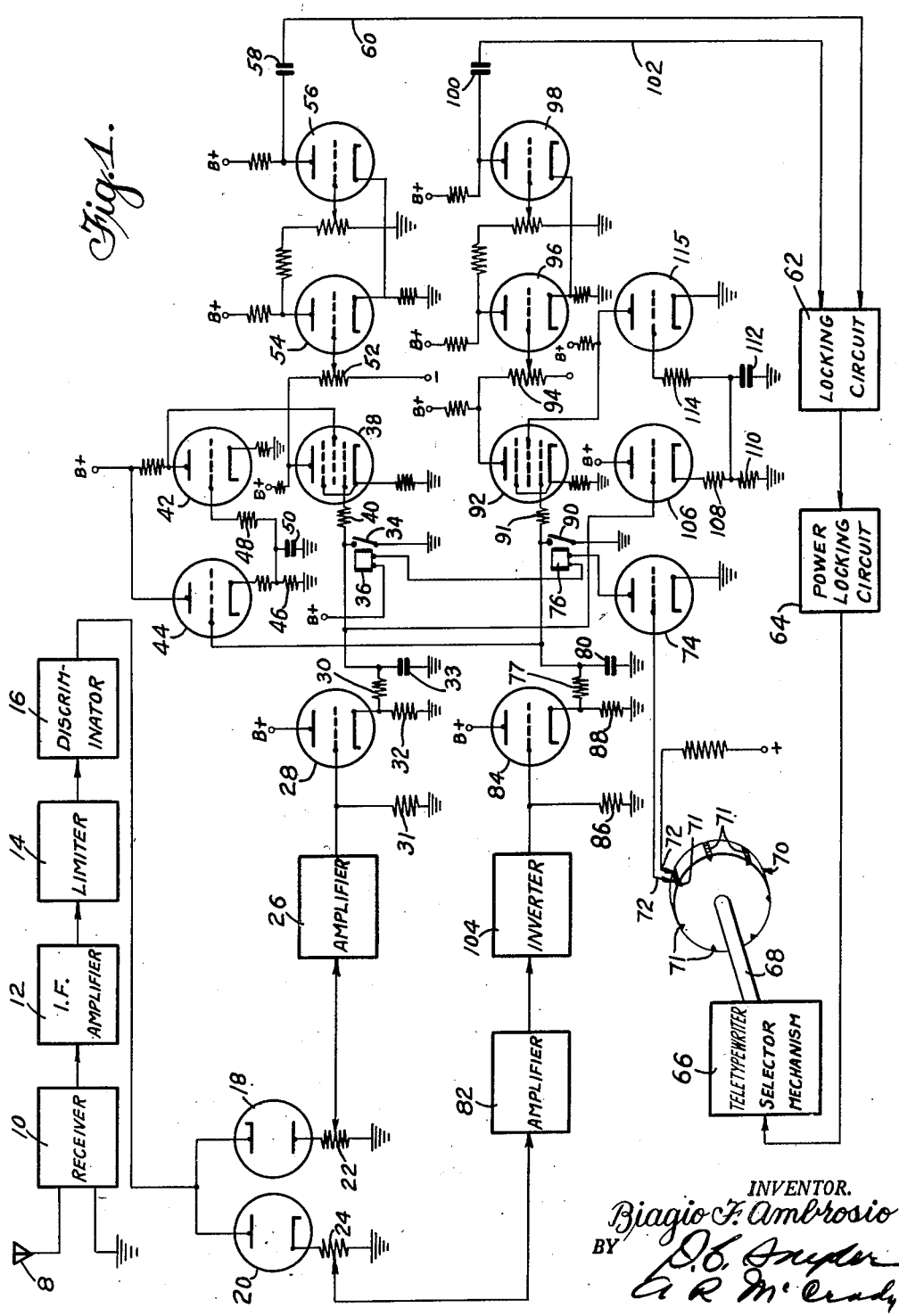
Fig. 1 is a schematic diagram of an embodiment of the invention.

Referring to Fig. 1, it will be seen that the incoming signal is received through antenna 8, receiver 10, I. F. amplifiers 12, limiter 14, and discriminator 16 arranged as a conventional frequency shift receiver producing an output which is fed to a separation circuit consisting of diodes 18 and 20, and voltage dividers 22 and 24. A signal of one polarity will pass through diode 18 at one time, and when the polarity of the signal changes the other diode will conduct. The signal from voltage divider 22 is amplified in amplifier 26 which is shown in block form since it may be of conventional design. The output of amplifier 26 passes to triode 28 having grid resistor 31 and cathode resistor 32 connected to ground. The low impedance cathode follower output of triode 28 is applied to the integrating circuit comprising resistor 30 and capacitor 33 which gives an output voltage that is proportional to the area under the input voltage curve. The time constant is adjusted to be much greater than the length of the pulses to be integrated in order that integration will take place on a substantially linear portion of the time constant curve. At the proper intervals as hereinafter explained, capacitor 33 is discharged to ground through relay contacts 34 which are controlled by the current in solenoid 36. When the charge on capacitor 33 reaches a certain value, the grid of pentode 38 which is connected to the capacitor through resistor 40 will permit tube 38 to fire. Pentode 38 will then conduct until the voltage on capacitor 33 is reduced to a low value. The grid voltage which will cause tube 38 to fire is controlled by the screen grid voltage which in turn is determined directly by the voltage at the plate of triode 42. This plate voltage is dependent upon a signal from the second signal channel fed to the grid of triode 44 which provides cathode follower output across resistor 46 and thence through an integrating circuit including resistor 48 and capacitor 50 to the grid of triode 42. The output of pentode 38 is fed through voltage divider 52 to trigger triodes 54 and 56 where it undergoes further amplification. The amplified output of triode 56 is taken, through capacitor 58 and lead 60, to a locking circuit 62 which is shown in block form since it will be understood to be the conventional flip-flop circuit found in radio teletypewriter apparatus. The output of locking circuit 62 controls power locking circuit 64 which in turn controls the character selecting mechanism 66 for printing the received information in usable form.

Selector mechanism 66 in a teletypewriter is commonly provided with selector cams about which a sleeve (not shown) rotates once for each character received, a shaft 68 is secured to this sleeve; and to this shaft a commutator 70 is operatively connected having 7 contacts 71 for the widely used five pulse per character code. These contacts are contacted by brushes 72 to send seven positive pulses per revolution of the commutator to triode 74 which contains solenoids 36 and 76 in its plate circuit. Solenoid 76 is effective when energized to ground the integrating circuit comprising resistor 77 and capacitor 80. This integrating circuit receives signals from diode 20 through components similar to those receiving signals from diode 18. Signals from diode 20 thus pass through amplifier 82, triode 84 having grid resistor 86 and cathode resistor 88, relay contacts 90, resistor 91, pentode 92, voltage divider 94, trigger triodes 96 and 98, and thence through capacitor 100 and lead 102 to locking circuit 62. An inverter 104 is placed between amplifier 82 and triode 84; since the purpose of the inverter is simply to reverse pulses from diode 20 to make them conform to the polarity of pulses from diode 18, the inverter may conveniently take the form of an additional amplification stage to produce the required 180 degree phase shaft. The grid of triode 106 is connected to the output of integrating capacitor 33. The cathode follower output of triode 106 between resistors 108 and 110 is integrated by means of capacitor 112 and the result fed through resistor 114 to the grid of triode 115, the output of which is connected to the screen grid of pentode 92.

Figure 2:
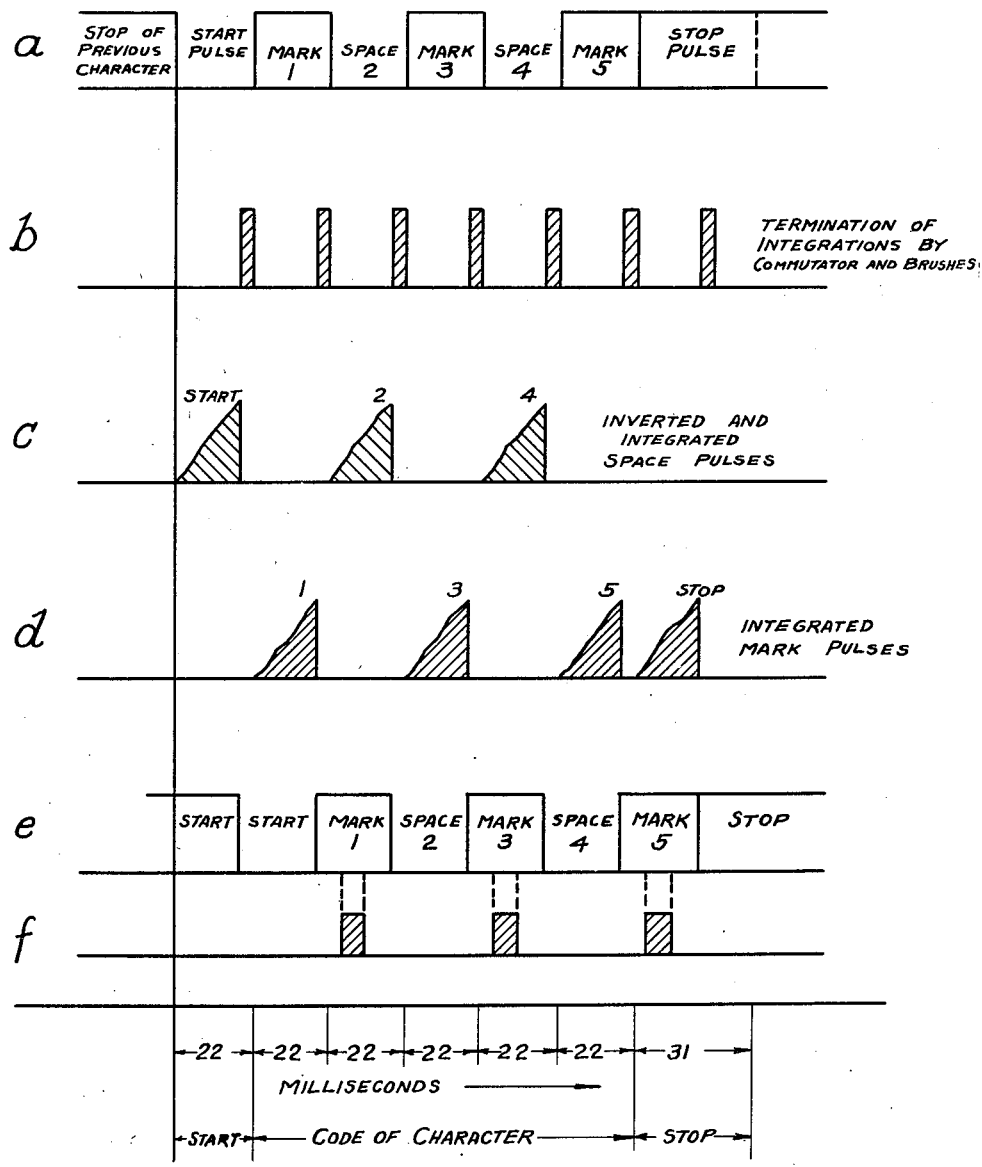
Fig. 2 is a series of curves illustrative of the operation of the invention in the presence of interference.

In Fig. 2 the appearance, in the conventional five pulse for character code, of wave forms for the letter "Y" is shown at various stages of reception. A common time scale for all steps lies along the bottom of the figure.

Fig. 2(a) shows the letter "Y" which consists of mark pulses 1, 3, and 5 in the teletypewriter code, and the accompanying initiating and terminating pulses and selection of the code bars in the teletypewriter machine. The total cycle for a complete operation for a teletypewriter receiving 60 words per minute is approximately 163 milliseconds.

Fig. 2(b) shows the position with respect to time of the brushes on the contacts on the periphery of the commutator 70. Tube 74 fires as each of these contacts rotates past the brushes, and relay contacts 34 and 90 are closed through the action of the tube plate current on high speed relays 36 and 76. Every contact terminates an integration of pulse voltage for a duration of one pulse.

Fig. 2(c) and 2(d) show the accumulation of voltage on condensers 33 and 80 respectively with respect to time. When the integration has reached the predetermined valve, this voltage is amplified by tubes 38 and 92 and triggers circuits including triodes 56 and 98 thereby transmitting a pulse to the locking circuit. This pulse is terminated as each commutator contact hits brushes 72.

Fig. 2(e) shows the pulses fed into the selector magnets from the locking circuits. They are delayed by approximately the length of a start pulse.

Fig. 2(f) shows the selection of the impulses, which takes place during a part of the existance of a full pulse. This takes place in a teletypewriter by coincidence between the selector magnets and the selector cams, and thereby a selection of a code bar takes place. This all happens within the internal operations of the teletypewriter printer.

In the operation of the above described apparatus, a signal which is continuous except for noise and interference is received through antenna 8 and phase shift receiver 10. The receiver output is amplified, limited, and passed through discriminator 16 which produces positive and negative pulses. The space pulses from diode 18 are amplified in amplifier 26 and sent to triode 28, the cathode follower output of which is integrated. The voltage on capacitor 33 builds up over a period of time; when the voltage reaches a certain amplitude, the pentode 38 will fire thus sending a pulse, after additional amplification, to the locking, power locking, and selector circuits of the teletypewriter. The mark pulses from diode 20 are amplified, then inverted and applied to a control grid of triode 84. The cathode follower output of triode 84 is integrated. Pentode 92 will conduct when the voltage on integrating capacitor 80 reaches a certain value. Pentode 92 continues to conduct until the voltage on integrating capacitor 80 is reduced which is accomplished by the brushes 72 as they contact the conducting segments 71 of the commutator. The position of the brushes controls the action of triode 74, the plate current of which is effective to energize relay solenoid windings 36 and 76 and thus regulate the position of relay contacts 34 and 90 which periodically discharge both integrating capacitors by short-circuiting them. The output of triode 42 so regulates the screen grid of pentode 38 that the pentode cannot conduct when the voltage on capacitor 50 is above a certain value. This means that spurious space signals cannot pass to the teletypewriter locking circuits after the integrating circuit in the marked channel has determined, after integration with respect to time, that a mark pulse definitely exists. The secondary integrating circuit in the cathode follower output of triode 44 which feeds triode 42 has a time constant of approximately the length of one pulse; its purpose is to hold over into the next pulse for automatic adjustment of the voltage at which pentode 38 will trigger a pulse which eventually reaches the teletypewriter locking circuit. There is a corresponding pair of triodes, 106 and 116, which receive a signal from the space channel and control the screen voltage on pentode 92 in the mark channel. Each pulse thus sets up a reference voltage for protecting the locking circuit; the mark pulse sets up a control on the space channel and vice versa.

Obviously many modifications and variations of the present invention are possible in the light of the above teachings. It is therefore to be understood that within the scope of the appended claims the invention may be practiced otherwise than as specifically described.

What is claimed is:

1. In a radio teletypewriter incorporating a one revolution clutch, a signal regeneration system comprising means for receiving a continuous wave phase shift signal, means for amplifying said signal, means for discriminating said signal to produce positive and negative pulses, means for integrating said positive pulses with respect to time, means for inverting said negative pulses, means for integrating said negative pulses with respect to time, a first trigger circuit connected to said means for integrating positive pulses and effective to produce a signal output when the integrated value of said positive pulses reaches a predetermined level, a second trigger circuit connected to said means for integrating inverted negative pulses and effective to produce a signal output when the integrated value of said inverted negative pulses reaches a predetermined level, teletypewriter locking circuit adapted to receive as an input the output signals of said first and second trigger circuits and to control the selection of characters in said teletypewriter, a commutator operatively connected to the one revolution clutch of said teletypewriter, and brushes operatively contacting said commutator and connected effective to cancel integrated positive and inverted negative pulses at predetermined intervals.

2. The invention defined in claim 1 comprising in addition a third integrating means effective to receive as an input the integrated value of said inverted negative pulses and to provide a voltage controlling the level at which said first trigger circuit will produce a signal output, and a fourth integrating means effective to receive as an input the integrated value of said positive pulses and to provide a voltage controlling the level at which said second trigger circuit will produce a signal output.

References Cited in the file of this patent

UNITED STATES PATENTS

| | | |
|---|---|---|
| 2,507,730 | Mitchell | May 16, 1950 |
| 2,606,975 | Goldfisher | Aug. 12, 1952 |